United States Patent
Noirot et al.

(10) Patent No.: US 8,931,959 B2
(45) Date of Patent: Jan. 13, 2015

(54) ROLLER BEARING WITH AT LEAST TWO ROWS OF ROLLING ELEMENTS, IN PARTICULAR FOR A TUNNELER

(71) Applicant: Aktiebolaget SKF, Göteborg (SE)

(72) Inventors: Jean-Baptiste Noirot, Avallon (FR); Cyril Bouron, Avallon (FR); Bruno Capoldi, Charentenay (FR); Jean-Baptiste Magny, Migé (FR); Pascal Ovize, Chitry le Fort (FR)

(73) Assignee: Aktiebolaget SK, Gothenburg (SE)

( * ) Notice: Subject to any disclaimer, the term of this patent is extended or adjusted under 35 U.S.C. 154(b) by 0 days.

(21) Appl. No.: 14/051,899

(22) Filed: Oct. 11, 2013

(65) Prior Publication Data

US 2014/0105532 A1   Apr. 17, 2014

(30) Foreign Application Priority Data

Oct. 12, 2012   (FR) ...................... 12 59773

(51) Int. Cl.
| | |
|---|---|
| *F16C 19/34* | (2006.01) |
| *F16C 33/58* | (2006.01) |
| *E21D 9/10* | (2006.01) |
| *F16C 19/18* | (2006.01) |
| *F16C 19/38* | (2006.01) |
| *F16C 19/40* | (2006.01) |
| *F16C 19/49* | (2006.01) |
| *F16C 19/54* | (2006.01) |

(52) U.S. Cl.
CPC .............. *F16C 33/563* (2013.01); *E21D 9/104* (2013.01); *F16C 19/188* (2013.01); *F16C 19/381* (2013.01); *F16C 19/40* (2013.01); *F16C 19/49* (2013.01); *F16C 19/545* (2013.01); *F16C 33/585* (2013.01); *F16C 2300/14* (2013.01)
USPC ........... 384/455; 384/513; 384/548; 384/604; 384/619

(58) Field of Classification Search
USPC ......... 384/452, 455–456, 513, 548, 561, 593, 384/615, 618, 622, 604, 619
See application file for complete search history.

(56) References Cited

U.S. PATENT DOCUMENTS

| | | | | |
|---|---|---|---|---|
| 2,469,677 | A | | 5/1949 | Witthofft |
| 3,652,141 | A | * | 3/1972 | Husten et al. ................. 384/455 |
| 4,422,697 | A | * | 12/1983 | Gugel et al. ................. 384/452 |
| 4,861,171 | A | * | 8/1989 | Adachi ........................ 384/455 |
| 5,074,677 | A | * | 12/1991 | Andree et al. ................ 384/448 |
| 6,543,938 | B2 | * | 4/2003 | Dittenhofer ................... 384/455 |

(Continued)

FOREIGN PATENT DOCUMENTS

| | | | | |
|---|---|---|---|---|
| DE | 3733951 | A1 * | 12/1988 | .............. F16C 19/52 |
| DE | 3811129 | A1 * | 10/1989 | .............. F16C 33/66 |

(Continued)

*Primary Examiner* — Marcus Charles
(74) *Attorney, Agent, or Firm* — Bryan Peckjian; SKF USA Inc. Patent Department

(57) ABSTRACT

The roller bearing comprises an inner ring, an outer ring, at least one row of rolling elements which are arranged between the rings in order to form an axial thrust which can transmit axial forces, and a row of rolling elements arranged between the rings in order to form a radial thrust which can transmit radial forces. The inner ring comprises an annular groove which extends towards the interior from an outer surface of the ring, and forms a raceway for the rolling elements of the radial thrust.

11 Claims, 2 Drawing Sheets

(56) References Cited

U.S. PATENT DOCUMENTS

| | | | |
|---|---|---|---|
| 8,002,472 B2* | 8/2011 | Craig et al. | 384/455 |
| 8,282,353 B2* | 10/2012 | Russ et al. | 416/131 |
| 8,523,453 B2* | 9/2013 | Loeschner et al. | 384/455 |
| 2010/0067838 A1 | 3/2010 | Frank | |
| 2010/0316322 A1* | 12/2010 | Derrer et al. | 384/571 |
| 2012/0020792 A1 | 1/2012 | Frank | |
| 2012/0228571 A1* | 9/2012 | Curchod | 254/416 |
| 2013/0202239 A1* | 8/2013 | Kikuchi | 384/569 |

FOREIGN PATENT DOCUMENTS

| | | | | |
|---|---|---|---|---|
| EP | 0375938 A1 | | 7/1990 | |
| FR | 2600132 A1 | * | 12/1987 | F16C 33/46 |
| FR | 2694610 A1 | | 2/1994 | |
| GB | 2378988 A | * | 2/2003 | F16C 19/54 |
| JP | 63312512 A | * | 12/1988 | F16C 19/54 |
| JP | H0165925 U | | 4/1989 | |
| WO | 2008058729 A1 | | 5/2008 | |
| WO | 2011141125 A1 | | 11/2011 | |

* cited by examiner

ROLLER BEARING WITH AT LEAST TWO ROWS OF ROLLING ELEMENTS, IN PARTICULAR FOR A TUNNELER

CROSS-REFERENCE

This application claims priority to French patent application no. 1259773 filed on Oct. 12, 2012, the contents of which are incorporated herein by reference.

TECHNICAL FIELD

The present invention relates to the field of roller bearings, in particular roller bearings comprising an outer ring, an inner ring, and at least two rows of rolling elements, such as rollers, arranged between the said rings.

RELATED ART

More particularly, the invention relates to the field of roller bearings with a large diameter, and in particular those used in tunnel boring machines, such as tunnelers.

Roller bearings of this type with a large diameter are generally loaded both radially and axially with relatively large loads. In this case, reference is made to an orientation roller bearing.

Patent application FR-A1-2 694 610 describes an orientation roller bearing comprising three rows of rollers arranged between the inner and outer rings, and wherein two rows make it possible to withstand axial forces. The third row of rollers makes it possible to withstand radial forces, and is arranged between the cylindrical outer surface of the inner ring, and a groove formed in the bore in the outer ring.

For a given diameter of the rollers which absorb the radial forces, the radial dimension of the bearing is relatively large with a solution of this type.

The object of the present invention is to eliminate this disadvantage.

SUMMARY

More particularly, the object of the present invention is to provide a roller bearing which makes it possible to withstand both axial and radial forces, and is easy to manufacture and assemble, and has a restricted radial dimension.

According to one embodiment, the roller bearing comprises an inner ring, an outer ring, at least one row of rolling elements which are arranged between the said rings in order to form an axial thrust which can transmit axial forces, and a row of rolling elements arranged between the said rings in order to form a radial thrust which can transmit radial forces. The inner ring comprises an annular groove which extends towards the interior from an outer surface of the said rings, and forms a raceway for the rolling elements of the radial thrust.

Advantageously, the groove has dimensions such that the axis of rotation of each of the rolling elements of the radial thrust is offset towards the interior relative to the outer surface of the inner ring. The raceway for the rolling elements can extend axially.

According to one embodiment, the outer ring comprises at least one mounting orifice which extends from an outer surface of the said ring, the said orifice opening into a bore of the outer ring and being radially opposite the groove of the inner ring. The roller bearing can also comprise a plug which closes the mounting orifice and forms locally a raceway for the rolling elements of the radial thrust.

Preferably, the rolling elements of the radial thrust have a diameter which is smaller than the diameter of the rolling elements of the axial thrust.

According to one embodiment, the outer ring comprises a stepped bore comprising an axial surface which forms locally a raceway for the rolling elements of the radial thrust. The axial surface of the outer ring can be extended by at least a radial surface which forms a raceway for the rolling elements of the axial thrust.

According to one embodiment, the bearing comprises at least two rows of rolling elements which form the axial thrust. The bearing can comprise a first row of rolling elements arranged between a radial surface of the inner ring and the outer ring, and second and third rows of rolling elements arranged between an opposite radial surface of the inner ring and the outer ring. Each rolling element of the second row can be in radial contact with a rolling element of the third row. The rolling elements can be rollers.

BRIEF DESCRIPTION OF THE DRAWINGS

The present invention will be better understood by reading the detailed description of an embodiment provided by way of example which is in no way limiting and is illustrated by the appended drawings, in which.

DETAILED DESCRIPTION OF THE INVENTION

Figure 1:
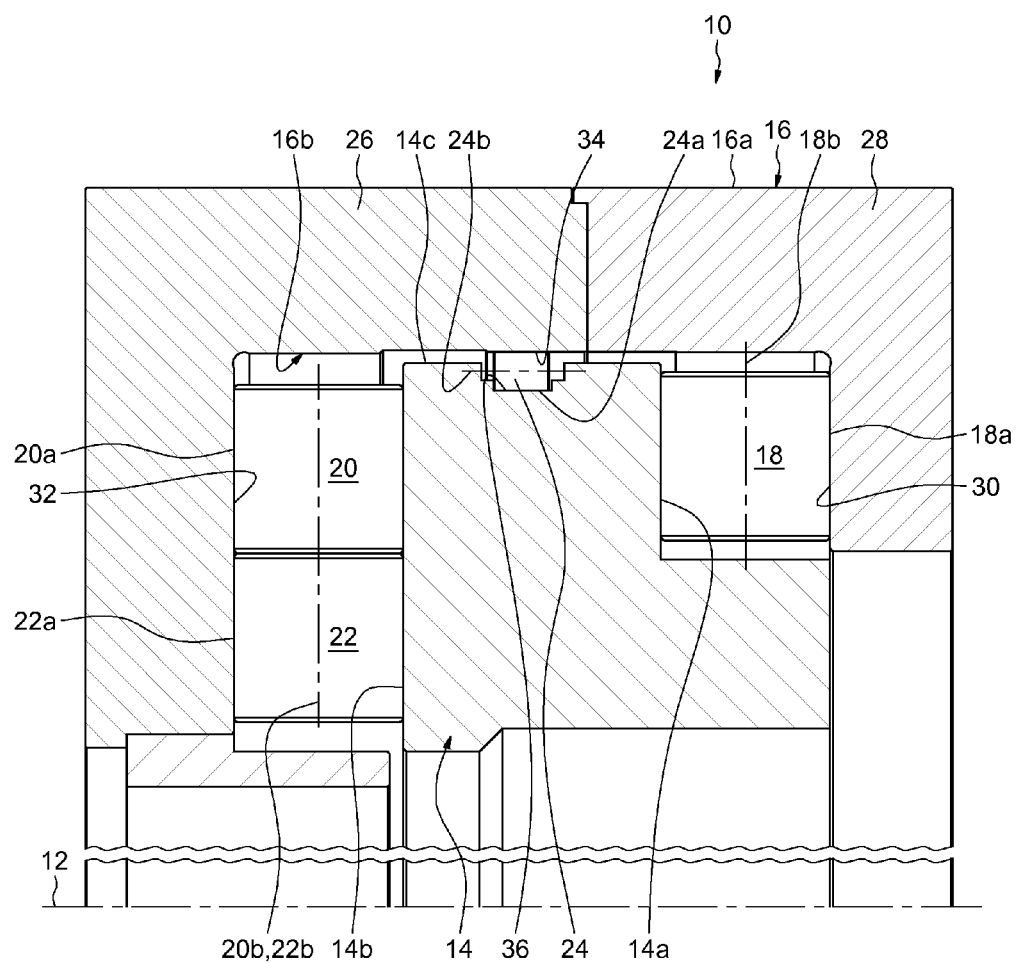
FIGS. 1 and 2 are half views in axial cross section according to different cross-sectional planes of a roller bearing according to an embodiment of the invention.

FIG. 1 shows the roller bearing 10 with a large diameter which can be used in particular in tunnel boring machines. The roller bearing 10 with an axis 12 comprises an inner ring 14, an outer ring 16, three rows of rollers 18, 20 and 22 which are arranged between the said rings in order to form an axial thrust which can transmit axial forces, and a row of rollers 24 which are arranged between the rings 14, 16 in order to form a radial thrust which can transmit radial forces. The inner 14 and outer 16 rings are concentric, and extend axially along the axis of rotation 12 of the bearing. As will be described in greater detail hereinafter, the inner ring 14 is designed to assist the radial compactness of the bearing 10.

The rollers 18, 20 and 22 of the axial thrust are identical to one another. Each roller comprises a cylindrical outer rolling surface 18a, 20a, 22a and two opposite end surfaces, which delimit axially the said outer rolling surface, taking into consideration the axis of rotation 18b, 20b, 22b of the said roller. The angle formed between each axis of rotation 18b, 20b, 22b of the rollers and the axis 12 of the bearing is equal to 90°. Similarly, each roller 24 of the radial thrust comprises a cylindrical outer rolling surface 24a, which is delimited axially, taking into consideration the axis of rotation 24b of the said roller, by two opposite end surfaces. The axis of rotation 24b of each roller 24 is parallel to the axis 12 of the bearing, and perpendicular to the axes 18a, 20a, 22a of each of the rollers 18, 20 and 22. In the embodiment illustrated, the diameter of the rollers 24 is smaller than the diameter of the rollers 18, 20 and 22, such that the bearing 10 can absorb a greater load in the axial direction.

In the embodiment illustrated, the outer ring 16 is made of two main parts 26, 28 which are assembled to one another by any appropriate means, for example by being bolted. The outer ring 16 comprises a cylindrical axial outer surface 16a and a stepped bore 16b on which there are formed first, second and third raceways 30, 32 and 34. The first raceway 30 is in the form of an annular radial surface which is in linear contact with the outer rolling surface 18a of each roller 18. The radial raceway 30 is extended, at the level of an edge with a large diameter, by a cylindrical axial surface of the stepped bore 16b which delimits locally the raceway 34 for the rollers 24. The axial raceway 34 has in straight cross section a straight inner profile which is in linear contact with the outer rolling surface 24a of each roller 24. The said axial surface of the stepped bore 16b is extended axially on the side opposite the raceway 30, by the raceway 32 which is in the form of an annular radial surface in linear contact with the outer surface 20a, 22a of each of the rollers 20, 22. In the embodiment illustrated, the rollers 20, 22 are arranged between the radial raceway 32 of the outer ring and the inner ring 14, such that the rollers 20 of one row are superimposed on the rollers 22 of the other row, whilst being coaxial. The inner end surface of each roller 20 is in radial contact with the outer end surface of the associated roller 22.

The inner ring 14 comprises a cylindrical bore which is designed to be fitted on a frame or a structure of a machine (not represented) and is delimited by two opposite lateral radial surfaces 14a, 14b. The radial surface 14a is axially opposite the raceway 30 of the outer ring, and forms the radial raceway for the rollers 18. The opposite radial surface 14b is axially opposite the raceway 32 of the outer ring, and forms a radial raceway for the rollers 20, 22.

The inner ring 14 also comprises a cylindrical outer surface 14c with a large diameter which is radially opposite the axial surface of the stepped bore 16b of the outer ring. The outer surface 14c extends axially the edges with a large diameter of the radial surfaces 14a, 14b. The outer surface 14c is connected to the said radial surfaces. An annular groove 36 is formed on the outer surface 14c and extends radially towards the interior. The base of the groove 36 is offset radially towards the interior relative to the outer surface 14c, and forms an axial raceway for the rollers 24. In the embodiment illustrated, the groove 36 has a stepped profile in straight cross section. Alternatively, the groove could have a profile in the form of a "U". The groove 36 faces radially towards the exterior, and is situated opposite the raceway 34 of the outer ring. The groove 36 is delimited by an axial base wall, and by two radial lateral walls which are formed on the same part of the inner ring 14.

The provision of the groove 36 which is formed in the inner ring, and delimits a raceway for the rollers 34 which is offset towards the interior relative to the outer surface 14c with a large diameter of the said ring, makes it possible to obtain a roller bearing with a reduced radial dimension. The rollers 24 are arranged radially between the raceways formed on the inner 14 and outer 16 rings, and are in direct contact with the said races, i.e. without interposition of tracks added onto the said rings.

In addition, the radial dimension of the groove 36 is designed such that the axis of rotation 24b of each roller is offset radially towards the interior relative to the outer surface 14c of the inner ring. This assists further the radial compactness of the bearing 10.

Figure 2:
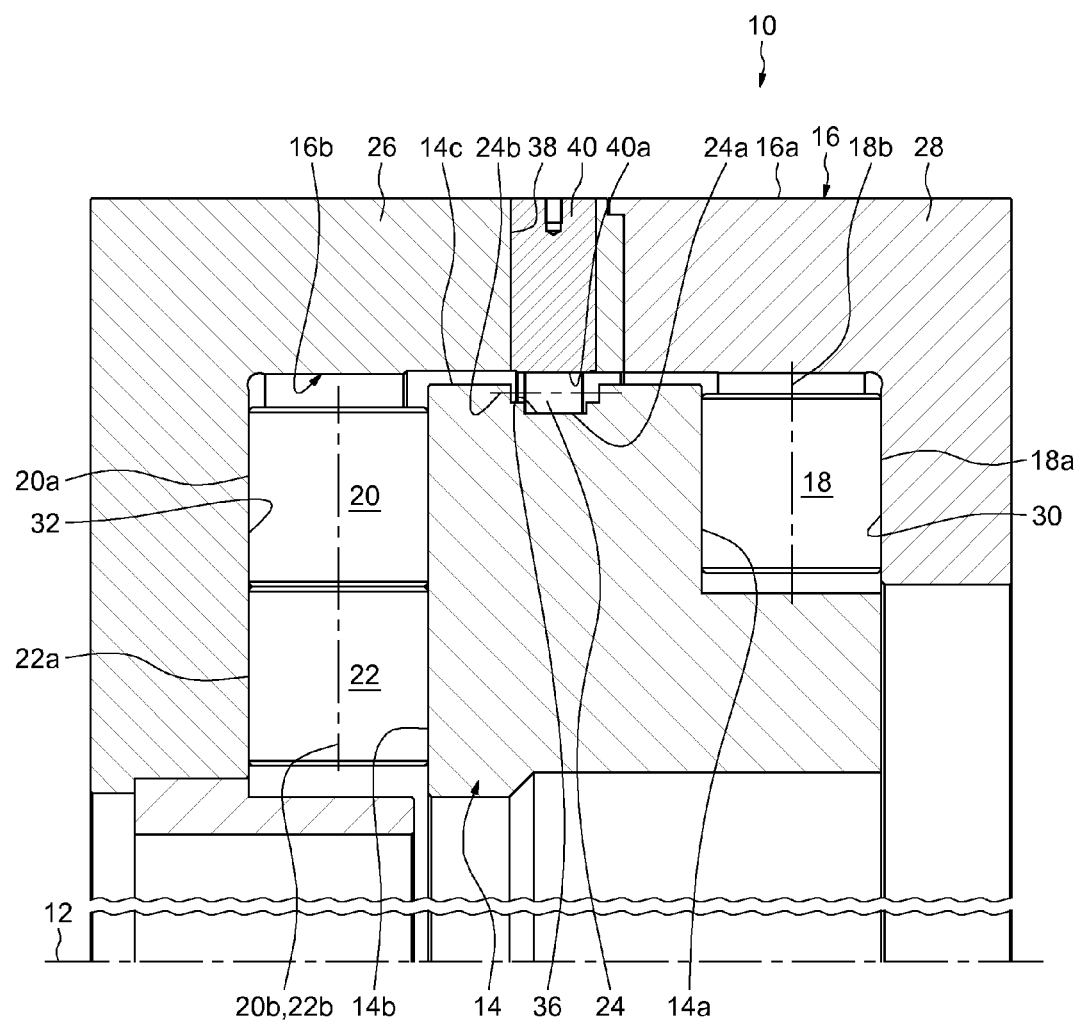

In order to permit the fitting of the rollers 24 inside the groove 36 in the inner ring, the outer ring 16 comprises a mounting orifice 38 (FIG. 2) which extends radially from the outer surface 16a of the said ring, and opens out on the raceway 34 formed on the stepped bore 16b. The orifice 38 opens out radially opposite the groove 36.

The bearing 10 also comprises a plug 40 which closes the orifice 38, and can for example be retained inside the said orifice by any appropriate means, for example by bolts which are used for the assembly of the two parts 26, 28 of the outer ring. The plug 40 comprises an axial end surface 40a which is flush with the raceway 34, such as to prevent surface discontinuity at the level of the orifice 38. The end surface 40a forms locally a raceway for the rollers 24. The orifice 38 permits the introduction and fitting of the rollers 24 at the level of the groove 36 in the inner ring, and inserts or a cage (not represented) which for example are/is segmented, and are/is provided between the rollers, in order to ensure their circumferential spacing. Similarly, inserts (not represented) are provided between the successive rollers 18, 20, 22 of each row.

In the embodiment illustrated, the roller bearing comprises three rows of rollers, in order to transmit axial forces. As a variant, it is possible to provide a different number of rows of rollers which form the axial thrust. For example, it can be envisaged to arrange two rows fitted on both sides of the inner ring, or a single row between the said inner ring and the outer ring.

The invention claimed is:

1. A roller bearing comprising:
   an inner ring;
   an outer ring; and
   at least one row of rolling elements arranged between the inner ring and the outer ring to form an axial thrust which can transmit axial forces,
   a row of rolling elements arranged between the inner and outer rings to form a radial thrust which can transmit radial forces,
   wherein the inner ring provides an annular groove that extends towards an interior from an outer surface of the inner ring and forms a raceway for the row of rolling elements of the radial thrust, and
   wherein the annular groove has dimensions such that the axis of rotation of each of the rolling elements of the radial thrust is offset towards the interior relative to the outer surface of the inner ring.

2. The bearing according to claim 1, wherein the raceway for the rolling elements of the radial thrust extends axially.

3. The bearing according to claim 2, wherein the outer ring comprises at least one mounting orifice that extends from an outer surface of the ring, the orifice opening into a bore in the outer ring and being radially opposite the annular groove of the inner ring.

4. The bearing according to claim 3, further comprising:
   a plug that closes the mounting orifice and forms locally a raceway for the rolling elements of the radial thrust.

5. The bearing according to claim 4, wherein the rolling elements of the radial thrust have a diameter which is smaller than the diameter of the rolling elements of the axial thrust.

6. The bearing according to claim 5, wherein the outer ring comprises a stepped bore having an axial surface that forms a raceway for the rolling elements of the radial thrust.

7. The bearing according to claim 6, wherein the axial surface of the outer ring is extended by at least a radial surface which forms a raceway for the rolling elements of the axial thrust.

8. The bearing according to claim 7 further comprising:
   at least two rows of rolling elements which form the axial thrust.

9. The bearing according to claim 8, wherein the at least two rows of rolling elements of the axial thrust include a first row of rolling elements arranged between a radial surface of the inner ring and the outer ring, and a second and a third row of rolling elements arranged between an opposite surface of the inner ring and the outer ring, each rolling element of the second row being in radial contact with a rolling element of the third row.

10. The bearing according to claim 9, wherein the each rolling element of the second row is coaxial with one of the rolling elements of the third row.

11. The bearing according to claim 1, wherein the raceway of the inner ring for the row of rolling elements of the radial thrust has a stepped cross sectional profile and a raceway of the outer ring for the row of rolling elements of the radial thrust has a straight inner profile.

* * * * *